US007054989B2

(12) United States Patent
Mizobata

(10) Patent No.: US 7,054,989 B2
(45) Date of Patent: May 30, 2006

(54) STREAM PROCESSOR

(75) Inventor: Norihiko Mizobata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 514 days.

(21) Appl. No.: 10/210,096

(22) Filed: Aug. 2, 2002

(65) Prior Publication Data

US 2003/0028791 A1 Feb. 6, 2003

(30) Foreign Application Priority Data

Aug. 6, 2001 (JP) ...................................... 2001-237433

(51) Int. Cl.
*G06F 13/00* (2006.01)

(52) U.S. Cl. .......................... 710/316; 710/29; 710/33; 710/38

(58) Field of Classification Search ............ 710/29–38, 710/305–317; 375/240 T
See application file for complete search history.

(56) References Cited

U.S. PATENT DOCUMENTS 5,313,649 A * 5/1994 Hsu et al. .................. 710/317
5,896,516 A * 4/1999 Powell et al. ............... 710/317
6,230,229 B1 * 5/2001 Van Krevelen et al. ..... 710/317
6,318,185 B1 * 11/2001 Aumard et al. ............... 73/818
6,404,811 B1 * 6/2002 Cvetko et al. ......... 375/240.01
6,636,931 B1 * 10/2003 Shah et al. ................. 710/317
6,701,407 B1 * 3/2004 Honjo et al. ................ 710/317
6,715,023 B1 * 3/2004 Abu-Lebdeh et al. ....... 710/317

FOREIGN PATENT DOCUMENTS

| | | |
|---|---|---|
| JP | 08-009328 | 1/1996 |
| JP | 10-155114 | 6/1998 |
| JP | 10-191163 | 7/1998 |
| JP | 11-177957 | 7/1999 |
| JP | 11-196975 | 10/1999 |

* cited by examiner

*Primary Examiner*—Christopher B. Shin
(74) *Attorney, Agent, or Firm*—McDermott Will & Emery LLP

(57) ABSTRACT

The stream processor of the present invention includes: a selection section and first to fifth processing sections. In the selection section, a plurality of inputs are associated with a plurality of outputs according to control from outside so that streams sent to the plurality of inputs are passed to the associated outputs. The first processing section sends a first stream to the first input among the plurality of inputs. The second processing section sends a second stream to the second input among the plurality of inputs. The third processing section receives a stream from the first output among the plurality of outputs. The fourth processing section receives a stream from the second output among the plurality of outputs. The fifth processing section receives a stream from the third output among the plurality of outputs, subjects the received stream to predetermined processing, and sends the processed stream to the third input among the plurality of inputs.

17 Claims, 11 Drawing Sheets

STREAM PROCESSOR

BACKGROUND OF THE INVENTION

The present invention relates to a stream processor handling a plurality of streams.

In recent years, there have increased cases of broadcasting, transmitting and storing images, voice and data in the form of digital data. For example, in digital TV broadcasting, DVD drives, digital VTRs, digital video cameras, IEEE 1394 devices and the like, video signals, audio signals and data in data broadcasting, electric program guide (EPG) and the like are collectively broadcast, transmitted, processed and stored as streams. Data formats for such streams vary with applications. For example, digital TV broadcasting and digital VTRs adopt transport streams defined by MPEG Systems Standard (ISO/IEC 13818-1). DVD drives adopt program streams defined by MPEG Systems Standard (ISO/IEC 13818-1). A DV format is adopted for transmission of recorded data from a digital video camera via an IEEE 1394 bus. Therefore, processing unique to each of these data formats is required.

Under the above circumstances, there has emerged digital AV equipment provided with a plurality of functions, in addition to conventional single-function equipment. For example, a digital TV receiver provided with an IEEE 1394 interface has functions of "receiving and displaying a program on the air", "receiving a program on the air and recording the program in an external storage device connected via an IEEE 1394 bus", and "playing back a program from an external storage device connected via an IEEE 1394 bus and displaying the program". A stream input into this digital TV receiver includes a "stream of a program on the air" and a "stream of a program played back from an external storage device connected via an IEEE 1394 bus". A stream output from the digital TV receiver includes a "stream of a program to be recorded in an external storage device connected via an IEEE 1394 bus". In this way, a plurality of streams are input into and output from the digital TV receiver.

A digital TV receiver includes a transport decoder as an LSI for processing a stream. The digital TV receiver also includes a stream input/output interface (for example, an IEEE 1394 interface) for passing a stream input from outside to the transport decoder and outputting a stream processed by the transport decoder to outside, as another LSI independent from the transport decoder LSI. Connection between these LSIs on a printed board is optimized depending on an application system. It is however impossible to assume all possible uses in the future, and thus the range of future applications is limited by assumption during the system design.

With recent advances in integration of LSI circuits, it has become possible to mount a transport decoder and a stream input/output interface as one LSI. In this situation, it has become necessary to assume during the design of the LSI, both the application range of the LSI to be adapted in the future during which the LSI will be kept used and functions expected to be realized by a system using the LSI.

With advances in audio/video digitization and networking, the number of types of the stream input/output interfaces has increased, and the number of streams to be processed simultaneously has increased. In addition, the processing of streams has been diversified.

SUMMARY OF THE INVENTION

An object of the present invention is providing a stream processor capable of improving the degree of freedom of the configuration of an apparatus having a function of processing a plurality of streams.

The stream processor of the present invention includes: a selection section and first to fifth processing sections. In the selection section, a plurality of inputs are associated with a plurality of outputs according to control from outside so that streams sent to the plurality of inputs are passed to the associated outputs. The first processing section sends a first stream to the first input among the plurality of inputs. The second processing section sends a second stream to the second input among the plurality of inputs. The third processing section receives a stream from the first output among the plurality of outputs.

The fourth processing section receives a stream from the second output among the plurality of outputs. The fifth processing section receives a stream from the third output among the plurality of outputs, subjects the received stream to predetermined processing, and sends the processed stream to the third input among the plurality of inputs.

Preferably, the selection section associates the plurality of inputs with the plurality of outputs in one-to-one relationship.

In the stream processor described above, by controlling the selection section, a stream from the first processing section can be sent to one of the third and fourth processing sections, and a stream from the second processing section can be sent to the other of the third and fourth processing sections. In addition, by controlling the selection section, a stream from one of the first and second processing sections can be sent to one of the third and fourth processing sections, and a stream from the other of the first and second processing sections can be sent to the fifth processing section. The stream processed by the fifth processing section can be sent to the other of the third and fourth processing sections. In this way, the allocation of the streams input into the selection section to the third to fifth processing sections can be freely changed, and this improves the degree of freedom of the configuration of an apparatus having the function of processing a plurality of streams.

Preferably, the selection section associates one input among the plurality of inputs with two outputs among the plurality of outputs.

In the stream processor described above, by controlling the selection section, a stream from the first processing section can be sent to both one of the third and fourth processing sections and the fifth processing section, and the stream processed by the fifth processing section can be sent to the other of the third and fourth processing sections. In addition, a stream from the first processing section can be sent to both the third and fourth processing sections.

Preferably, the selection section multiplexes at least two outputs among the plurality of outputs to obtain one new output.

In the stream processor described above, a plurality of streams can be output from one-line output.

DESCRIPTION OF THE PREFERRED EMBODIMENTS

Figure 1:
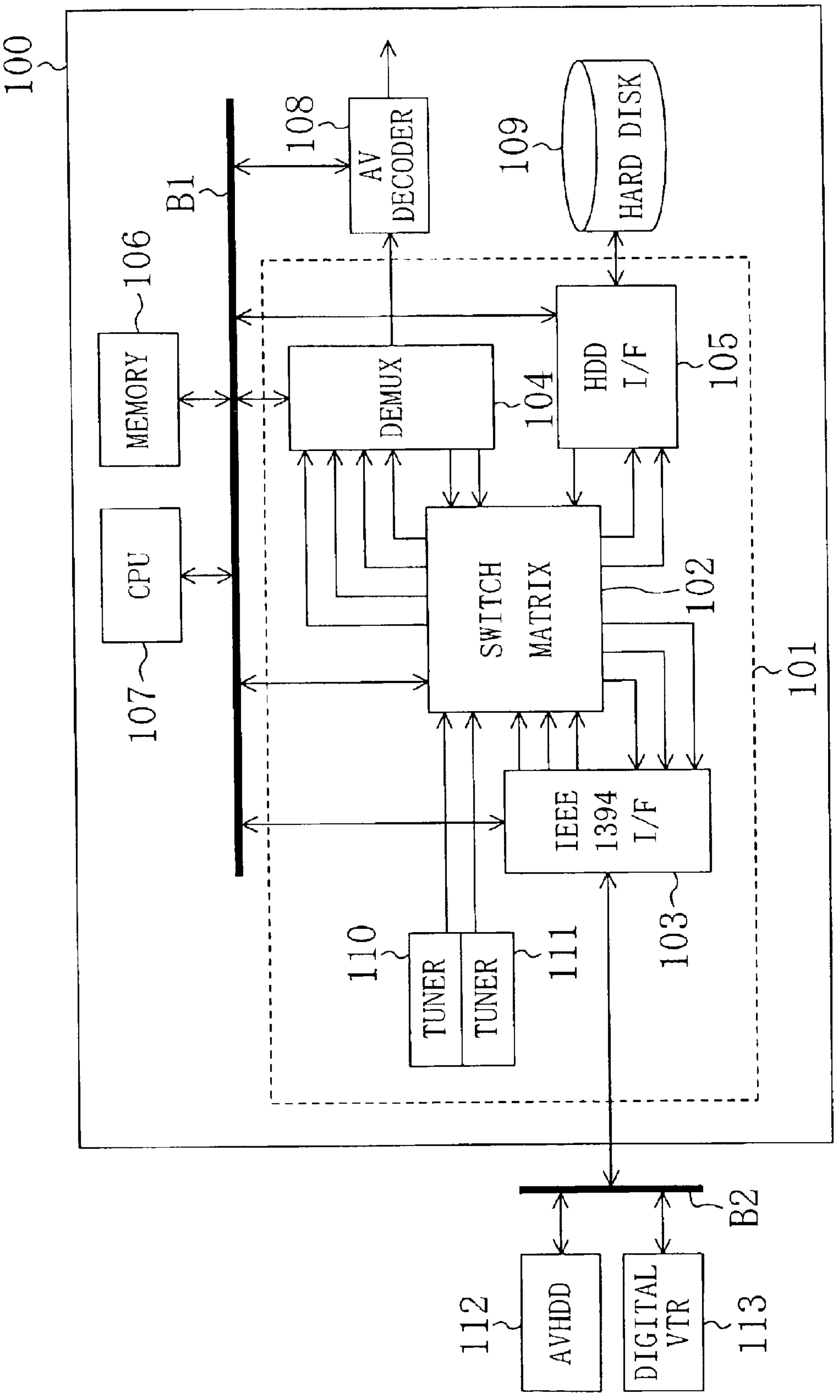
FIG. 1 is a block diagram showing the entire configuration of a system in Embodiment 1 of the present invention.

Hereinafter, preferred embodiments of the present invention will be described with reference to the accompanying drawings. Note that identical or similar components are denoted by the same reference numerals throughout the drawings, and the description thereof is not repeated.

Embodiment 1

<Entire Configuration of System>

FIG. 1 is a block diagram showing the entire configuration of a digital TV receiver system in Embodiment 1 of the present invention. The system shown in FIG. 1 includes a digital TV receiver 100, an AVHDD 112 and a digital VTR 113.

The digital TV receiver 100 includes a stream processor 101, a memory 106, a CPU 107, an AV decoder 108 and a hard disk device 109.

The stream processor 101 includes tuners 110 and 111, a switch matrix 102, an IEEE 1394 interface 103, a demultiplexer 104 and a HDD interface 105. The tuners 110 and 111, for receiving digital TV broadcasts, output received broadcast streams to the switch matrix 102. The stream processor 101 receives broadcast streams at the tuners 110 and 111, a stream from an IEEE 1394 bus B2, and a played back stream from the hard disk device 109. The input streams are processed, and stored in the memory 106 or output as processed streams. The input streams may otherwise be output as they are. The stream processor 101 outputs streams to the IEEE 1394 bus B2, the hard disk device 109 and the AV decoder 108.

The memory 106 is a main memory of the digital TV receiver 100, used during execution of software by the CPU 107 or for storage of data. The memory 106 also store streams processed by the stream processor 101.

The AV decoder 108 decompresses AV data received/played back by the digital TV receiver 100.

The hard disk device 109 records a stream output from the stream processor 101 and outputs a stream stored therein to the stream processor 101.

The AVHDD 112 is a hard disk device having a function of recording/playing back a digital AV stream. The AVHDD 112, provided with an interface for connection with the bus B2, records a stream input from the bus B2 and outputs a played back stream to the bus B2.

The digital VTR 113 is a VTR having a function of recording/playing back a digital AV stream. The digital VTR 113 records a stream input from the bus B2 and outputs a played back stream to the bus B2.

<Internal Configuration of Stream Processor>

Figure 2:
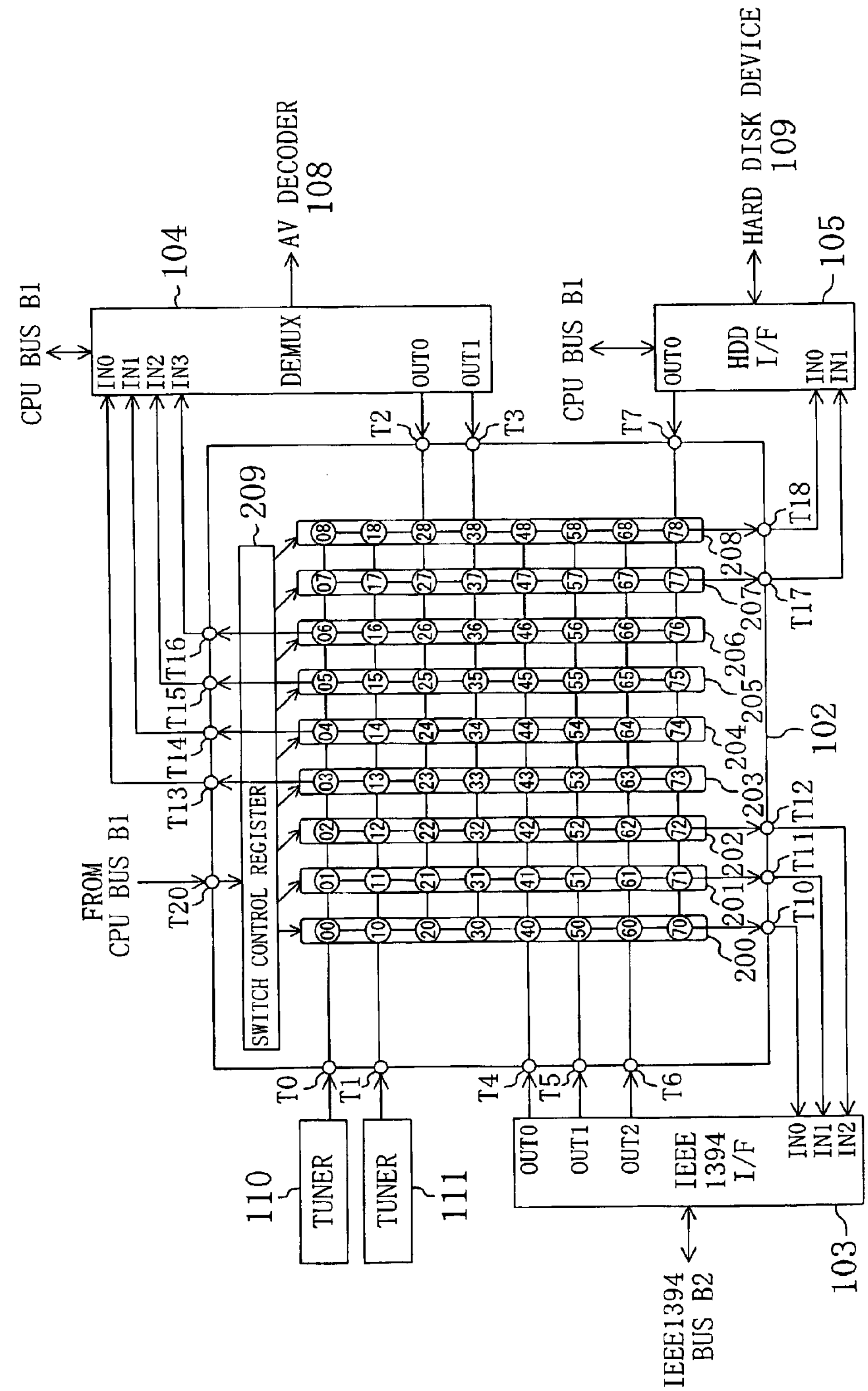
FIG. 2 is a block diagram of details of a stream processor shown in FIG. 1.

FIG. 2 is a block diagram of details of the stream processor 101 shown in FIG. 1.

(Switch Matrix 102)

Referring to FIG. 2, the switch matrix 102 includes input terminals T0 to T7 and T20, output terminals T10 to T18, switch groups 200 to 208 and a switch control register 209.

The input terminals T0 and T1 receive streams from the tuners 110 and 111. The input terminals T2 and T3 receive streams from output ports OUT0 and OUT1 of the demultiplexer 104. The input terminals T4 to T6 receive streams from output ports OUT0 to OUT2 of the IEEE 1394 interface 103. The input terminal T7 receives a stream from an output port OUT0 of the HDD interface 105. The input terminal T20 receives a control signal from a CPU bus B1.

The switch groups 200 to 208 include switches (00, 10, . . . , 70) to (08, 18, . . . , 78), which pass streams input at the input terminals T0 to T7 to the output terminals T10 to T18 when they are in the ON state.

The switch control register 209 gives control signals to the switch groups 200 to 208 in response to a control signal sent to the input terminal T20 from the CPU 107 via the bus B1. Each of the control signals given to the switch groups 200 to 208 is a signal designating a switch to be turned ON among the switches included in the relevant switch group. The switch groups 200 to 208 turn ON each one switch among the relevant switches ((00, 10, . . . , 70) to (08, 18, . . . , 78)) in response to the respective control signals from the switch control register 209. In other words, each of the switch groups 200 to 208 selects one stream among streams sent to the input terminals T0 to T7 in response to the control signal from the switch control register 209, and outputs the selected stream to the corresponding one of the output terminals T10 to T18.

In the switch matrix 102 having the configuration described above, each of the output terminals T10 to T18 is associated with one of the input terminals T0 to T7 according to the control signal from the switch control register 209, and the stream input at the associated input terminal is output from each of the output terminals T10 to T18. In other words, each of eight streams input at the input terminals T0 to T7 can be output from an arbitrary one of the nine output terminals T10 to T18.

(IEEE 1394 Interface 103)

The IEEE 1394 interface 103 includes three input ports IN0 to IN2 and three output ports OUT0 to OUT2. Streams from the output terminals T10 to T12 of the switch matrix 102 are sent to the input ports IN0 to IN2. Streams from the output ports OUT0 to OUT2 of the IEEE 1394 interface 103 are sent to the input terminals T4 to T6 of the switch matrix 102. The IEEE 1394 interface 103 outputs streams received from the bus B2 from the output ports OUT0 to OUT2 after change of the interface format, and outputs streams received at the input ports IN0 to IN2 to the bus B2 after change of the interface format.

(HIDD Interface 105)

The HDD interface 105 includes two input ports IN0 and IN1 and one output port OUT0. Streams from the output terminals T18 and T17 of the switch matrix 102 are sent to the input ports IN0 and IN1 of the HDD interface 105. A stream from the output port OUT0 of the HDD interface 105 is sent to the input terminal T7 of the switch matrix 102. The HDD interface 105 outputs a stream received from the hard disk device 109 from the output port OUT0 after change of the interface format, and outputs streams received at the input ports IN0 and IN1 to the hard disk device 109 after change of the interface format.

(Demultiplexer 104)

The demultiplexer 104 includes four input ports IN0 to IN3 and two output ports OUT0 and OUT1. Streams from the output terminals T13 to T16 of the switch matrix 102 are sent to the input ports IN0 to IN3 of the demultiplexer 104. Streams from the output ports OUT0 and OUT1 of the demultiplexer 104 are sent to the input terminals T2 and T3 of the switch matrix 102. The demultiplexer 104 can process four streams input at the input ports IN0 to IN3 simultaneously. The demultiplexer 104 outputs processed streams from the output ports OUT0 and OUT1. In addition, the demultiplexer 104 stores the results of demultiplexing (retrieval of data from a stream) into the memory 106 via the bus B1 or outputs the results to the AV decoder 108.

<Simultaneous Execution of a Plurality of Processing Items>

In the system having the configuration described above, various streams can be processed in various ways and output simultaneously, as will be described below in detail.

(Processing 1)

Figures 3A, 3B, 3C, 3D:
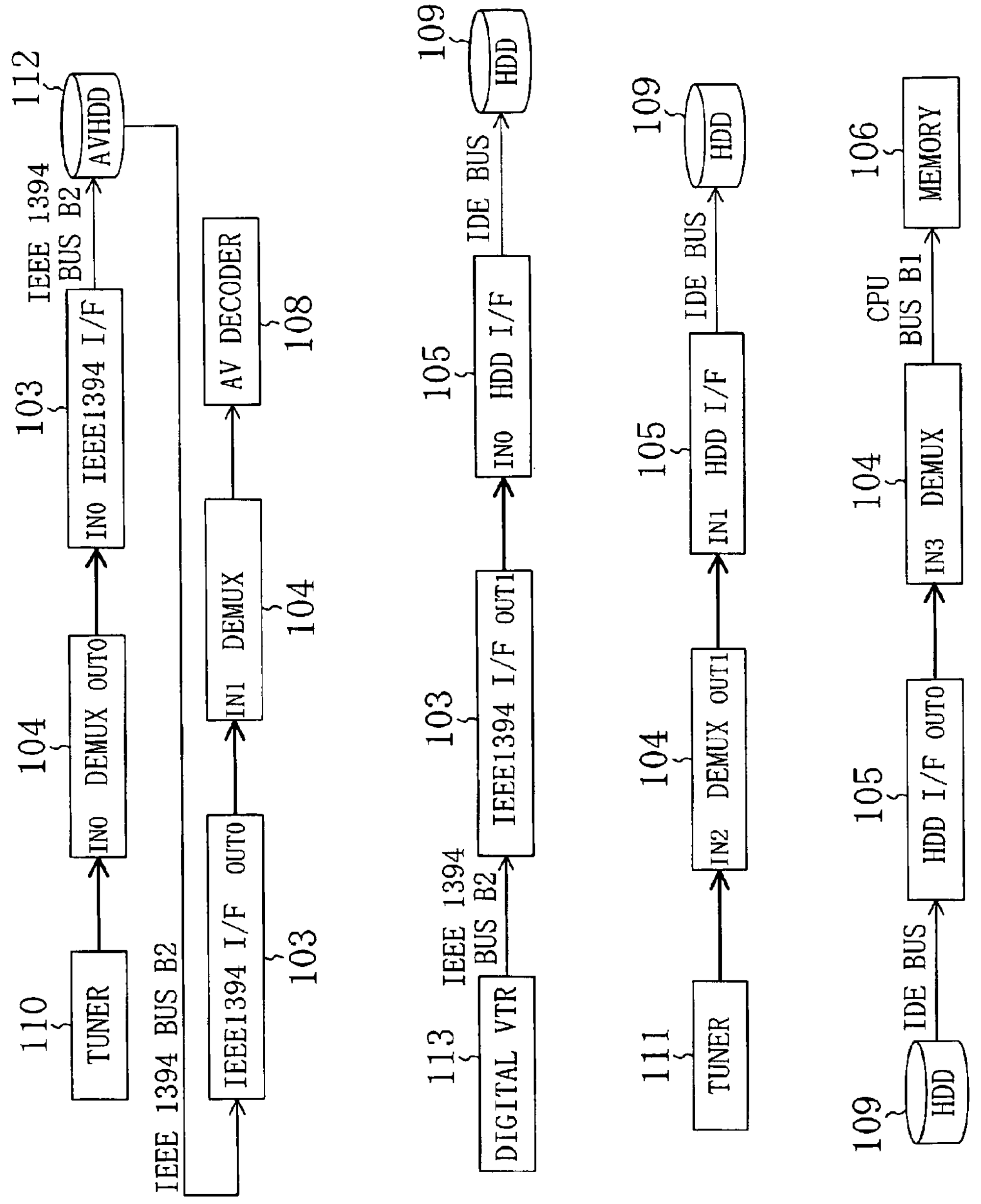
FIG. 3A is an illustration of processing of retrieving a stream of a desired program from a broadcast stream and storing the retrieved stream in an AVHDD connected to an IEEE 1394 bus.
FIG. 3B is an illustration of processing of dubbing a program stream from a digital VTR to an external hard disk device.
FIG. 3C is an illustration of processing of retrieving a program stream from another received broadcast and recording the retrieved stream in the hard disk device.
FIG. 3D is an illustration of processing of retrieving data broadcast information stored in the hard disk device and transferring the retrieved data to a memory for processing by a CPU.

Processing of temporarily storing a received program in the AVHDD 112 and playing back/displaying the program at a differential time (processing 1) will be described with reference to FIGS. 1, 2 and 3A.

First, described is processing of retrieving a stream of a desired program from a broadcast stream and storing the retrieved stream in the AVHDD 112.

The CPU 107 sends a control signal to the switch control register 209 of the switch matrix 102 instructing to turn ON the switch 03 of the switch group 203 and the switch 20 of the switch group 200 (to allow passing of relevant streams). In response to the control signal, the switch control register 209 sends control signals to the switch groups 203 and 200 to turn ON the switches 03 and 20. In response to these control signals, the switches 03 and 20 are turned ON.

A broadcast stream (encrypted stream) received by the tuner 110 is sent to the input terminal T0 of the switch matrix 102, passes through the switch 03, and is output from the output terminal T13 to the input port IN0 of the demultiplexer 104.

The demultiplexer 104 is set in advance by the CPU 107 to decrypt an encrypted stream input at the input port IN0 and retrieve a stream constituting a desired program. The demultiplexer 104 decrypts the encrypted broadcast stream input at the input port IN0, retrieves a stream constituting a desired program, and outputs the retrieved stream from the output port OUT0. The stream output from the output port OUT0 of the demultiplexer 104 is sent to the input terminal T2 of the switch matrix 102. The stream at the input terminal T2 then passes through the switch 20 and is output from the output terminal T10 to the input port IN0 of the IEEE 1394 interface 103. The IEEE 1394 interface 103 sends the received stream to the AVHDD 112 via the bus B2. The AVHDD 112 stores the received stream.

Next, described is processing of sequentially reading the program stream stored in the AVHDD 112 for differential-time playback of the received program.

The CPU 107 sends a control signal instructing to turn ON the switch 44 of the switch group 204, in addition to the switch 03 of the switch group 203 and the switch 20 of the switch group 200, to the switch control register 209 of the switch matrix 102. In response to the control signal, the switch control register 209 sends a control signal to the switch group 204 to turn ON the switch 44 in addition to the switches 03 and 20. In response to this control signal, the switch 44 is turned ON in addition to the switches 03 and 20.

The demultiplexer 104 is set in advance by the CPU 107 to retrieve AV data from a stream input at the input port IN1 and outputs the retrieved data to the AV decoder 108, in addition to the above setting.

The program stream stored in the AVHDD 112 is sequentially read and sent to the input terminal T4 of the switch matrix 102 via the output port OUT0 of the IEEE 1394 interface 103. The stream at the input terminal T4 passes through the switch 44 and is output from the output terminal T14 to the input port IN1 of the demultiplexer 104. The demultiplexer 104 retrieves AV data constituting the program and outputs the retrieved data to the AV decoder 108, to thereby perform AV playback of the played back program. Thus, in the manner described above, a received program is temporarily stored in the AVHDD 112 and then played back/displayed at a differential time.

(Processing 2)

Next, processing of dubbing a program stream from the digital VTR 113 to the external hard disk device 109 (processing 2) will be described with reference to FIGS. 1, 2 and 3B. Processing 2 is performed in parallel with processing 1 described above.

The CPU 107 sends a control signal to the switch control register 209 of the switch matrix 102 instructing to turn ON the switch 58 of the switch group 208. In response to the control signal, the switch control register 209 sends a control signal to the switch group 208 to turn ON the switch 58. In response to this control signal, the switch 58 is turned ON. The IEEE 1394 interface 103 is set to output a played back stream from the digital VTR 113 from the output port OUT1. Also, the HDD interface 105 is set to store a stream input at the input port IN0 into the hard disk device 109.

When a stream is played back from the digital VTR 113 after the settings described above, the played back stream is sent to the input terminal T5 of the switch matrix 102 via the output port OUT1 of the IEEE 1394 interface 103. The stream at the input terminal T5 passes through the switch 58, is output from the output terminal T18 to the input port IN0 of the HDD interface 105, and then stored into the hard disk device 109.

The route of the passing of the stream in the switch matrix 102 in processing 2 is different from that in processing 1 described above. Therefore, processing 2 can be performed in parallel with processing 1 simultaneously.

(Processing 3)

Next, processing of retrieving a program stream from another received broadcast and recording the retrieved program in the hard disk device 109 (processing 3) will be described with reference to FIGS. 1, 2 and 3C. Processing 3 is performed in parallel with processing 1 and processing 2 described above.

The CPU 107 sends a control signal to the switch control register 209 of the switch matrix 102 instructing to turn ON the switch 15 of the switch group 205 and the switch 37 of the switch group 207. In response to the control signal, the switch control register 209 sends control signals to the switch groups 205 and 207 to turn ON the switches 15 and 37. In response to these control signals, the switches 15 and 37 are turned ON.

A broadcast stream received by the tuner 111 is sent to the input terminal T1 of the switch matrix 102, passes through the switch 15, and is output from the output terminal T15 to the input port IN2 of the demultiplexer 104.

The demultiplexer 104 is set in advance by the CPU 107 to retrieve a stream constituting a desired program. The demultiplexer 104 retrieves a stream constituting a desired program from the broadcast stream input at the input port IN2 and outputs the retrieved stream from the output port OUT1. The stream output from the output port OUT1 of the demultiplexer 104 is sent to the input terminal T3 of the switch matrix 102. The stream at the input terminal T3 passes through the switch 37 and is output from the output terminal T17 to the input port IN1 of the HDD interface 105. The HDD interface 105 sends the stream to the hard disk device 109 to be stored therein.

The route of the passing of the stream in the switch matrix 102 in processing 3 is different from those in processing 1 and processing 2 described above. Therefore, processing 3 can be performed in parallel with processing 1 and processing 2 simultaneously.

(Processing 4)

Next, processing of retrieving data broadcast information stored in the hard disk device 109 and transferring the information to the memory 106 for processing by the CPU 107 (processing 4) will be described with reference to FIGS. 1, 2 and 3D. Processing 4 is performed in parallel with processing 1 to processing 3 described above.

The CPU 107 sends a control signal to the switch control register 209 of the switch matrix 102 instructing to turn ON the switch 76 of the switch group 206. In response to the control signal, the switch control register 209 sends a control signal to the switch group 206 to turn ON the switch 76. In response to this control signal, the switch 76 is turned ON. The demultiplexer 104 is set by the CPU 107 to retrieve data broadcast information from a stream input at the input port IN3 and store the retrieved information into the memory 106.

The HDD interface 105 retrieves data broadcast information stored in the hard disk device 109 and sends the retrieved information from the output port OUT0 to the input terminal T7 of the switch matrix 102. The stream at the input terminal T7 passes through the switch 76 and is output from the output terminal T16 to the input port IN3 of the demultiplexer 104. The demultiplexer 104 retrieves data broadcast information from the stream at the input port IN3 and stores the retrieved information into the memory 106 according to the setting, so that the CPU 107 can perform processing with reference to the data broadcast information stored in the memory 106.

The route of the passing of the stream in the switch matrix 102 in processing 4 is different from those in processing 1 to processing 3 described above. Therefore, processing 4 can be performed in parallel with processing 1 to processing 3 simultaneously.

<A Plurality of Processing Items for One Stream>

In the system shown in FIG. 1, a plurality of processing items can be performed for one stream, as will be described below in detail.

(Case 1)

Figure 4A:
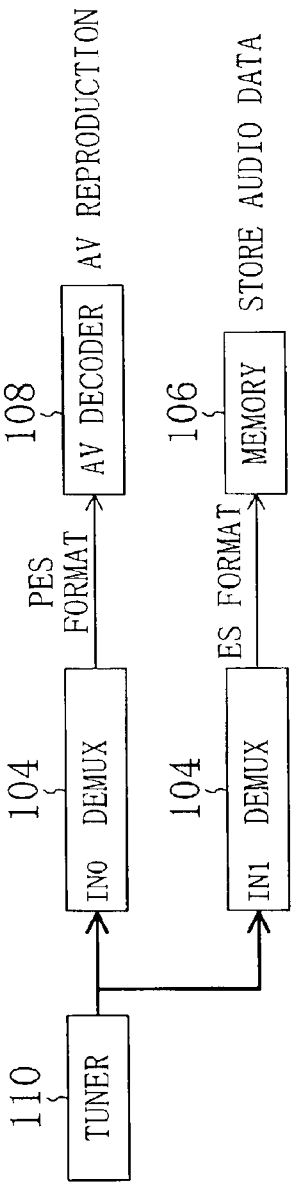
FIG. 4A is an illustration of a case of performing AV playback of a broadcast program and storing audio data of the program in a memory simultaneously.

First, a case of performing AV playback of a broadcast program and storage of audio data of the program into the memory 106 simultaneously (case 1) will be described with reference to FIGS. 1, 2 and 4A.

The CPU 107 sends a control signal to the switch control register 209 of the switch matrix 102 instructing to turn ON the switch 03 of the switch group 203 and the switch 04 of the switch group 204. In response to the control signal, the switch control register 209 sends control signals to the switch groups 203 and 204 to turn ON the switches 03 and 04. In response to these control signals, the switches 03 and 04 are turned ON. The demultiplexer 104 is set by the CPU 107 to retrieve AV data of a program to be viewed from a stream input at the input port IN0 in a packetized elementary stream (PES) packet format and outputs the retrieved data to the AV decoder 108. In addition, the demultiplexer 104 is set to retrieve audio data of a program to be viewed from a stream input at the input port IN1 as an elementary stream and stores the retrieved data into the memory 106.

A broadcast stream received by the tuner 110 is sent to the input terminal T0 of the switch matrix 102. The stream passes through the switch 03 and is output from the output terminal T13 to the input port IN0 of the demultiplexer 104. The demultiplexer 104 retrieves AV data of a program to be viewed from the stream in the PES packet format and outputs the retrieved data to the AV decoder 108. The broadcast stream sent from the tuner 110 also passes through the switch 04 and is output from the output terminal T14 to the input port IN1 of the demultiplexer 104. The demultiplexer 104 retrieves audio data of the program to be viewed from the stream in the elementary stream format and stores the retrieved data into the memory 106.

Thus, a plurality of processing items can be performed for one stream simultaneously by branching the stream.

(Case 2)

Figure 4B:
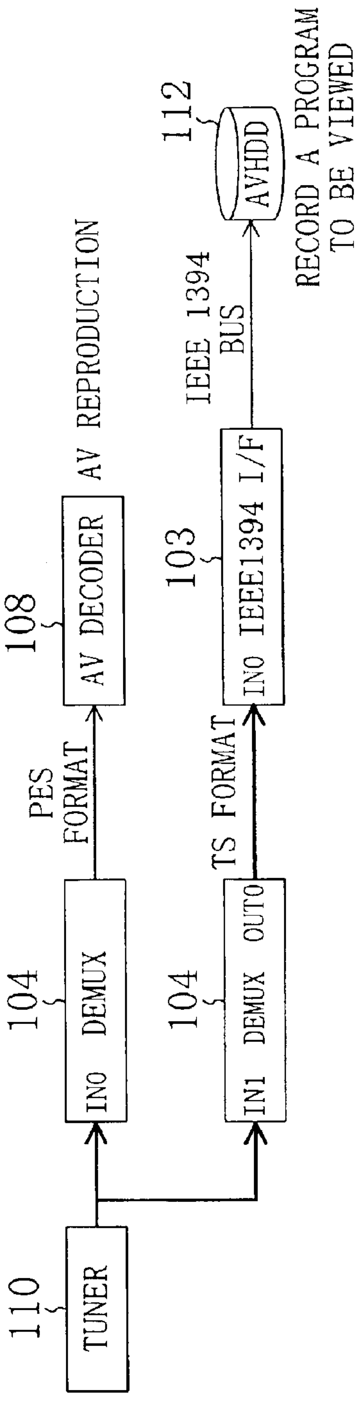
FIG. 4B is an illustration of a case of performing AV playback of a broadcasting program stream and recording the same program in the AVHDD in a transport stream format simultaneously.

Next, a case of performing AV playback of a broadcast program and recording of the same program in the AVHDD 112 in a transport stream format simultaneously (case 2) will be described with reference to FIGS. 1, 2 and 4B.

The CPU 107 sends a control signal to the switch control register 209 of the switch matrix 102 instructing to turn ON the switch 03 of the switch group 203, the switch 04 of the switch group 204 and switch 20 of the switch group 200. In response to the control signal, the switch control register 209 sends control signals to the switch groups 203, 204 and 200 to turn ON the switches 03, 04 and 20. In response to these control signals, the switches 03, 04 and 20 are turned ON. The demultiplexer 104 is set by the CPU 107 to retrieve AV data of a program to be viewed from a stream input at the input port IN0 in the PES packet format and outputs the retrieved data to the AV decoder 108. In addition, the demultiplexer 104 is set to retrieve a stream of a program to be viewed from a stream input at the input port IN1 and output the retrieved stream from the output port OUT0 in the transport stream format. Moreover, the IEEE 1394 interface 103 is set to record a stream input at the input port IN0 into the AVHDD 112.

A broadcast stream received by the tuner 110 is sent to the input terminal T0 of the switch matrix 102. The stream passes through the switch 03 and is output from the output terminal T13 to the input port IN0 of the demultiplexer 104. The demultiplexer 104 retrieves AV data of a program to be viewed From the stream in the PES packet format and outputs the retrieved data to the AV decoder 108. The broadcast stream from the tuner 110 also passes through the switch 04 and is output from the output terminal T14 to the input port IN1 of the demultiplexer 104. The demultiplexer 104 retrieves the program to be viewed from the stream in the transport stream format and outputs the retrieved program from the output port OUT0. The stream output from the output port OUT0 of the demultiplexer 104 is sent to the input terminal T2 of the switch matrix 102, passes through the switch 20, and is output from the output terminal T10 to the input port IN0 of the IEEE 1394 interface 103. The IEEE 1394 interface 103 sends the received stream to the AVHDD 112 via the bus B2 to be recorded therein.

Thus, a plurality of processing items can be performed for one stream simultaneously by branching the stream.

<Other Processing>

Figure 5:
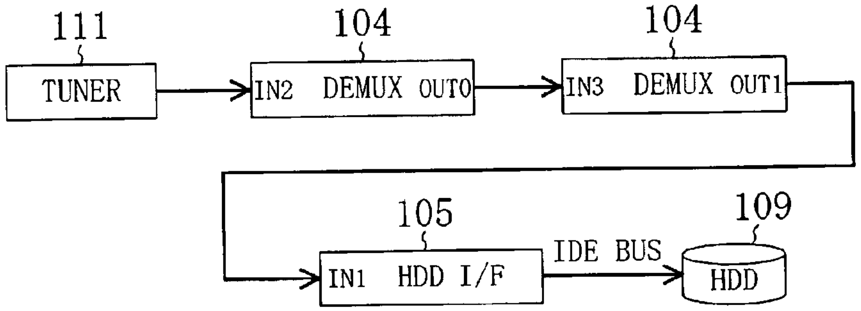
FIG. 5 is an illustration of processing of retrieving a program stream from a received broadcast, decrypting the program stream from encryption for broadcasting, encrypting the decrypted program stream for hard-disk recording, and recording the encrypted program stream in the hard disk device.

Processing of retrieving a program stream from a received broadcast, decrypting the program stream from encryption for broadcasting, encrypting the decrypted program stream for hard disk recording, and recording the encrypted program stream in the hard disk device 109 will be described with reference to FIGS. 1, 2 and 5.

The CPU 107 sends a control signal to the switch control register 209 of the switch matrix 102 instructing to turn ON the switch 15 of the switch group 205, the switch 26 of the switch group 206 and the switch 37 of the switch group 207. In response to the control signal, the switch control register 209 sends control signals to the switch groups 205, 206 and 207 to turn ON the switches 15, 26 and 37. In response to these control signals, the switches 15, 26 and 37 are turned ON. A broadcast stream received by the tuner 111 is sent to the input terminal T1 of the switch matrix 102, passes through the switch 15, and is output from the output terminal T15 to the input port IN2 of the demultiplexer 104.

The demultiplexer 104 is set in advance by the CPU 107 to retrieve a stream constituting a program to be recorded from a stream input at the input port IN2 and decrypt the stream from encryption for broadcasting. In addition, the demultiplexer 104 is set in advance to encrypt a stream input at the input port IN3 for hard disk recording.

The demultiplexer 104 retrieves a stream constituting a desired program from the broadcast stream input at the input port IN2, decrypts the stream from encryption for broadcasting, and outputs the decrypted stream from the output port OUT0.

The stream output from the output port OUT0 of the demultiplexer 104 is sent to the input terminal T2 of the switch matrix 102. The stream at the input terminal T2 passes through the switch 26 and is output from the output terminal T16 to the input port IN3 of the demultiplexer 104.

The demultiplexer 104 encrypts the stream input at the input port IN3 for hard disk recording and outputs the encrypted stream from the output port OUT1.

The stream output from the output port OUT1 of the demultiplexer 104 is sent to the input terminal T3 of the switch matrix 102. The stream at the input terminal T3 passes through the switch 37 and is output from the output terminal T17 to the input port IN1 of the HDD interface 105. The HDD interface 105 sends the received stream to the hard disk device 109 to be stored therein.

As described above, the stream input into the demultiplexer 104 is decrypted from encryption for broadcasting, and the decrypted stream is input again into the demultiplexer 104 via the switch matrix 102. The stream is then encrypted for hard disk recording in the demultiplexer 104, and after re-passing through the switch matrix 102, stored in the hard disk device 109 via the HDD interface 105.

<Effect>

Thus, in the system in Embodiment 1, a plurality of streams can be processed in parallel with each other, or can be output directly as they are, simultaneously. In addition, the system configuration can be freely changed depending on the setting of the switches of the switch matrix 102.

The numbers of input/output ports of the switch matrix 102, the IEEE 1394 interface 103 and the HDD interface 105 are not limited to those described above, but can be freely determined depending on the system configuration required. Other types of stream input/output interfaces and stream processing circuits may also be used.

Embodiment 2

<Entire Configuration of System>

Figure 6:
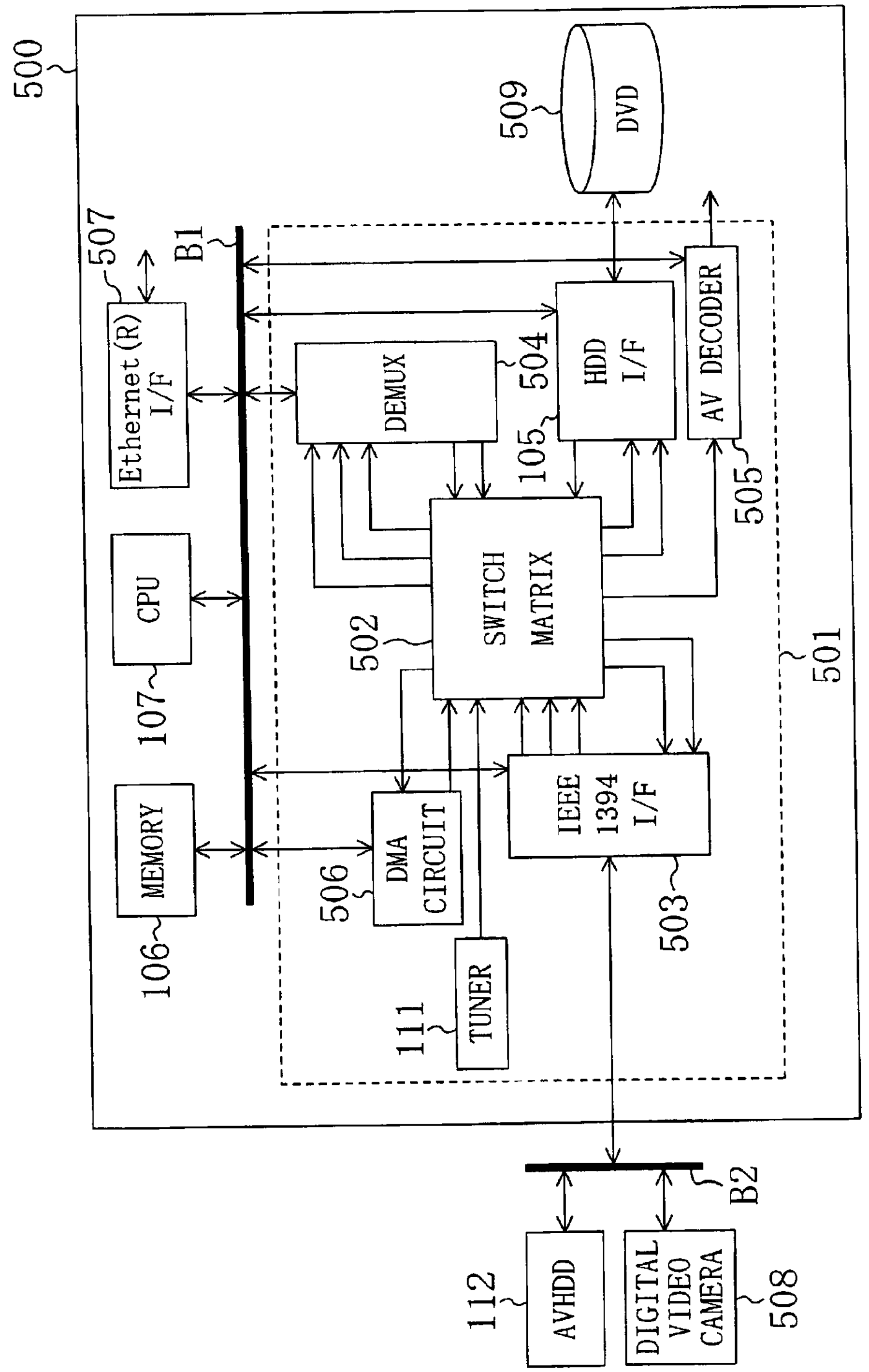
FIG. 6 is a block diagram showing the entire configuration of a system in Embodiment 2 of the present invention.

FIG. 6 is a block diagram showing the entire configuration of a digital TV receiver system in Embodiment 2 of the present invention. The system shown in FIG. 6 includes a digital TV receiver 500, an AVHDD 112 and a digital video camera 508.

The digital TV receiver 500 includes a stream processor 501, a memory 106, a CPU 107, an Ethernet(R) interface 507 and a DVD drive 509.

The stream processor 501 includes a tuner 111, a switch matrix 502, an IEEE 1394 interface 503, a demultiplexer 504, an AV decoder 505, a HDD interface 105 and a DMA circuit 506. The stream processor 501 receives a broadcast stream at the tuner 111, a stream from a bus B2, and a played back stream from the DVD drive 509. These input streams may be processed and stored in the memory 106 or output as processed streams. The input streams may otherwise be output directly as they are. Alternatively, the streams may be stored in the memory 106, and streams in the memory 106 may be read and input into the stream processor 501. The streams are output from the stream processor 501 to the bus B2 and the DVD drive 509.

The DVD drive 509 receives a stream output from the stream processor 501 for recording and outputs a stored stream to the stream processor 501.

The Ethernet(R) interface 507 transfers data received via Ethernet(R) to the memory 106 and transfers data in the memory 106 to the Ethernet(R).

The digital video camera 508 plays back a recorded AV stream via the bus B2 and records an AV stream received via the bus B2.

<Internal Configuration of Stream Processor 501>

Figure 7:
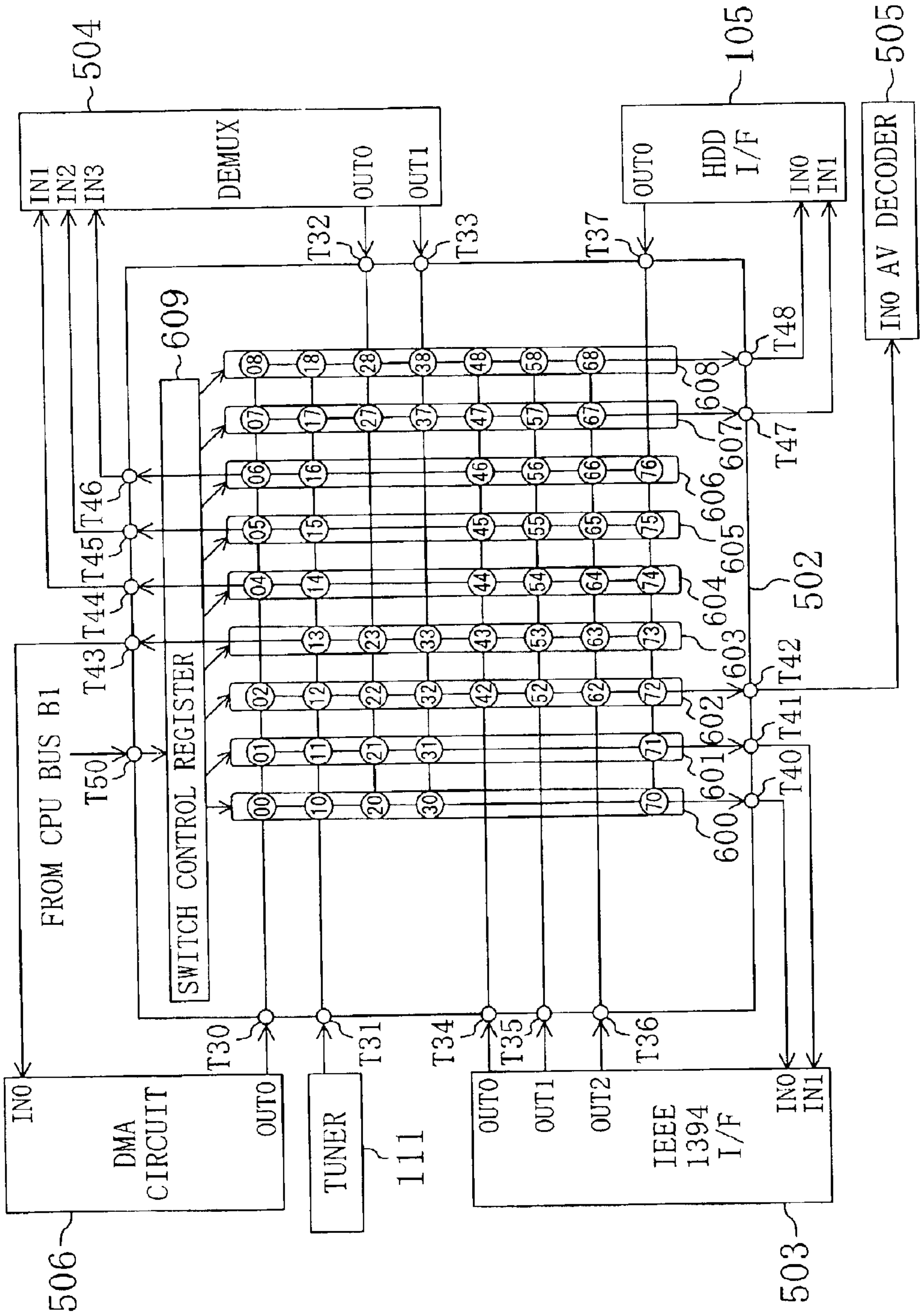
FIG. 7 is a block diagram of details of a stream processor shown in FIG. 6.

FIG. 7 is a block diagram of details of the stream processor 501 shown in FIG. 6.

(Switch Matrix 502)

Referring to FIG. 7, the switch matrix 502 includes input terminals T30 to T37 and T50, output terminals T40 to T48, switch groups 600 to 608 and a switch control register 609.

The input terminal 30 receives a stream from an output port OUT0 of the DMA circuit 506. The input terminal T31 receives a stream from the tuner 111. The input terminals T32 and T33 receive streams from output ports OUT0 and OUT1 of the demultiplexer 504. The input terminals T34 to T36 receive streams from output ports OUT0 to OUT2 of the IEEE 1394 interface 503. The input terminal T37 receives a stream from an output port OUT0 of the HDD interface 105. The input terminal T50 receives a control signal from a bus B1.

The switch group 600 includes switches 00, 10, 20, 30 and 70, which pass streams input at the input terminals T30 to T33 and T37 to the output terminal T40 when they are in the ON state. The switch group 601 includes switches 01, 11, 21, 31 and 71, which pass streams input at the input terminals T30 to T33 and T37 to the output terminal T41 when they are in the ON state. The switch group 602 includes switches 02, 12, . . . , 72, which pass streams input at the input terminals T30 to T37 to the output terminal T42 when they are in the ON state. The switch group 603 includes switches 13, 23, . . . , 73, which pass streams input at the input terminals T31 to T37 to the output terminal T43 when they are in the ON state. The switch group 604 includes switches 04, 14, 44, 54, 64 and 74, which pass streams input at the input terminals T30, T31 and T34 to T37 to the output terminal T44 when they are in the ON state. The switch group 605 includes switches 05, 15, 45, 55, 65 and 75, which pass streams input at the input terminals T30, T31 and T34 to T37 to the output terminal T45 when they are in the ON state. The switch group 606 includes switches 06, 16, 46, 56, 66 and 76, which pass streams input at the input terminals T30, T31 and T34 to T37 to the output terminal T46 when they are in the ON state. The switch group 607 includes switches 07, 17, . . . , 67, which pass streams input at the input terminals T30 to T36 to the output terminal T47 when they are in the ON state. The switch group 608 includes switches 08, 18, . . . , 68, which pass streams input at the input terminals T30 to T36 to the output terminal T48 when they are in the ON state.

In the switch groups 600 to 608, switches are partly omitted unlike the switch groups 200 to 208 shown in FIG. 2. This is because switches related to improbable routes of streams, such as a case that a stream sent from the IEEE 1394 interface 503 is output to the IEEE 1394 interface 503, are omitted.

The switch control register 609 gives control signals to the switch groups 600 to 608 in response to a control signal sent to the input terminal T50 from the CPU 107 via the bus B1. Each of the control signals given to the switch groups 600 to 608 is a signal designating a switch to be turned ON among the switches included in the relevant switch group. Each of the switch groups 600 to 608 turns ON the designated switch in response to the control signal from the switch control register 609. In other words, each of the switch groups 600 to 608 selects one among streams sent to the input terminals T30 to T37 and outputs the selected stream to the corresponding one of the output terminals T40 to T48.

In the switch matrix 502 having the configuration described above, each of eight streams input at the input terminals T30 to T37 can be output from a designated one of the nine output terminals T40 to T49.

(IEEE 1394 Interface 503)

The IEEE 1394 interface 503 includes two input ports IN0 and IN1 and three output ports OUT0 to OUT2. Streams from the output terminals T40 and T41 of the switch matrix 102 are sent to the input ports IN0 and IN1 of the IEEE 1394 interface 503. Streams from the output ports OUT0 to OUT2 of the IEEE 1394 interface 503 are sent to the input terminals T34 to T36 of the switch matrix 502. The IEEE 1394 interface 503 outputs streams received from the bus B2 from the output ports OUT0 to OUT2 after change of the interface format, and outputs streams received at the input ports IN0 and IN1 to the bus B2 after change of the interface format.

(HDD Interface 105)

The HDD interface 105 includes two input ports IN0 and IN1 and one output port OUT0. Streams from the output terminals T48 and T47 of the switch matrix 502 are sent to the input ports IN0 and IN1 of the HDD interface 105. A stream from the output port OUT0 of the HDD interface 105 is sent to the input terminal T37 of the switch matrix 502. The HDD interface 105 outputs a stream received from the DVD drive 509 from the output port OUT0 after change of the interface format, and outputs streams received at the input ports IN0 and IN1 to the DVD drive 509 after change of the interface format.

(Demultiplexer 504)

The demultiplexer 504 includes three input ports IN1 to IN3 and two output ports OUT0 and OUT1. Streams from the output terminals T44 to T46 of the switch matrix 502 are sent to the input ports IN1 to IN3 of the demultiplexer 504. Streams from the output ports OUT0 and OUT1 of the demultiplexer 504 are sent to the input terminals T32 and T33 of the switch matrix 502. The demultiplexer 504 can process three streams input at the input ports IN1 to IN3 simultaneously. The demultiplexer 504 outputs processed streams from the output ports OUT0 and OUT1. In addition, the demultiplexer 504 outputs data of the results of demultiplexing (data retrieval from a stream) to the memory 106 via the bus B1 for storage.

(DMA Circuit 506)

The DMA circuit 506 includes an input port IN0 and an output port OUT0. A stream from the output terminal T43 of the switch matrix 502 is sent to the input port IN0 of the DMA circuit 506. A stream from the output port OUT0 of the DMA circuit 506 is sent to the input terminal T30 of the switch matrix 502. The DMA circuit 506 writes a stream received at the input port IN0 into the memory 106 via the bus B1 while memorizing the write position of the stream in the memory 106. In addition, the DMA circuit 506 reads a stream written in the memory 106 via the bus B1 and outputs the stream at the output port OUT0 while memorizing the read position of the stream in the memory 106.

<Processing>

A plurality of processing items can be performed for various streams in the system shown in FIG. 6, as will be described below in detail.

(Processing 1)

Figure 8A:
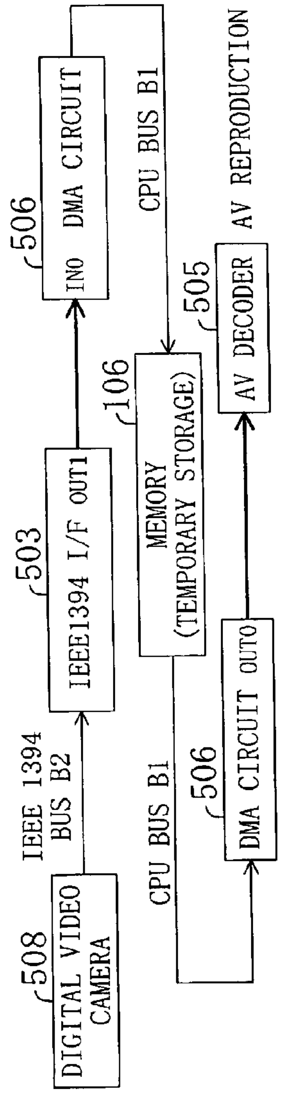
FIG. 8A is an illustration of processing of decoding and playing back images/voice played back from a digital video camera with an AV decoder.

First, a case of decoding and playing back images/voice played back from the digital video camera 508 with the AV decoder 505 will be described with reference to FIGS. 6, 7 and 8A.

The CPU 107 sends a control signal to the switch control register 609 instructing to turn ON the switch 53 of the switch group 603 and the switch 02 of the switch group 602. In response to the control signal, the switch control register 609 sends control signals to the switch groups 603 and 602 to turn ON the switches 53 and 02. In response to these control signals, the switches 53 and 02 are turned ON. In addition, the address of a data storage region of the memory 106 is set in the DMA circuit 506, and the DMA circuit 506 is set so as to store an input stream into this data storage region and also read a stream from the data storage region in response to a data request from the AV decoder 505.

An audio/video stream output from the digital video camera 508 is input into the IEEE 1394 interface 503 via the bus B2, and then sent from the output port OUT1 of the IEEE 1394 interface 503 to the input terminal T35 of the switch matrix 502. The input stream passes through the switch 53 and is output from the output terminal T43 to the input port IN0 of the DMA circuit 506. The DMA circuit 506 writes the received stream into the data storage region of the memory 106. During this writing, it is ensured that the DMA circuit 506 does not write the stream into a region in which an unread stream is stored by referring to the stream read position in the memory 106. In other words, the DMA circuit 506 writes the stream into a region of the memory 106 excluding a region in which an unread stream is stored.

Upon receipt of a data request from the AV decoder 505, the DMA circuit 506 reads a stream stored in the data storage region of the memory 106 and sends the stream to the input terminal T30 of the switch matrix 502 from the output port OUT0. During this reading, the DMA circuit 506 reads the stream from a region in which the stream is stored by referring to the stream write position in the memory 106. The read stream passes through the switch 02 and is output from the output terminal T42 to the input port IN0 of the AV decoder 505, where the stream is subjected to AV decoding and then displayed/played back.

(Processing 2)

Figure 8B:
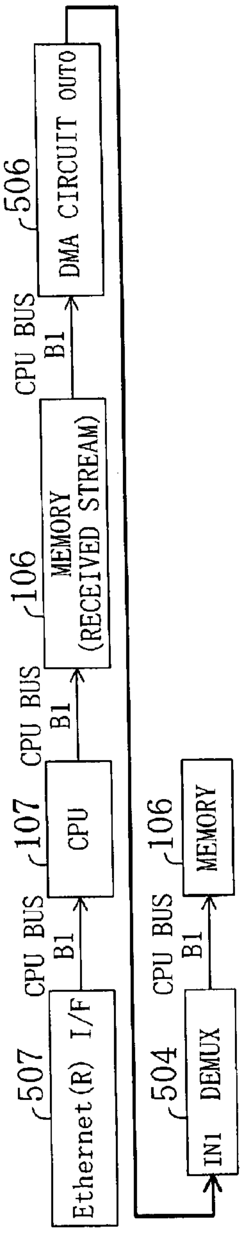
FIG. 8B is an illustration of processing of demultiplexing a stream received via Ethernet (R) and retrieved by a CPU.

Next, a case of demultiplexing a stream received via Ethernet(R) and retrieved by the CPU 107 will be described with reference to FIGS. 6, 7 and 8B.

The CPU 107 sends a control signal to the switch control register 609 instructing to turn ON the switch 04 of the switch group 604. In response to the control signal, the switch control register 609 sends a control signal to the switch group 604 to turn ON the switch 04. In response to this control signal, the switch 04 is turned ON. The demultiplexer 504 is set so as to demultiplex a stream input at the input port IN1 and store the processed result into the memory 106. Also, the DMA circuit 506 is set so as to read a stream from a received stream storage region of the memory 106 and output the read stream from the output port OUT0.

A packet received by the Ethernet(R) interface 507 is stored in an Ethernet(R) data receiving region of the memory 106 via the bus B1. The CPU 107 processes the Ethernet(R) packet, retrieves a desired stream from the packet, and stores the stream into the received stream storage region of the memory 106.

The DMA circuit 506 reads a stream stored in the received stream storage region of the memory 106 and outputs the read stream from the output port OUT0 to the input terminal T30 of the switch matrix 502. The stream passes through the switch 04 and is output from the output terminal T44 to the input port IN1 of the demultiplexer 504. The demultiplexer 504 demultiplexes the input stream and stores the resultant data into the memory 106.

Thus, a stream received via an interface different from a normal stream interface, such as the Ethernet(R) interface, can be demultiplexed.

(Processing 3)

Figure 8C:
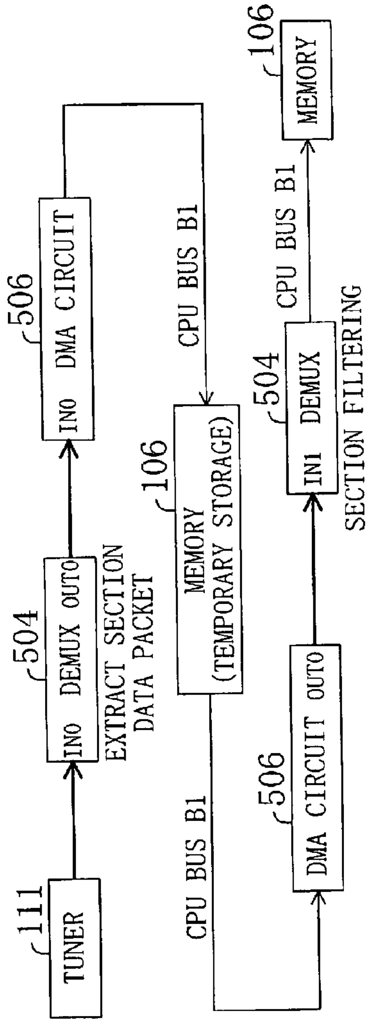
FIG. 8C is an illustration of processing of retrieving a program table, decryption key data and the like from a broadcast stream received by a tuner, for processing by software of a digital TV receiver.

Next, a case of retrieving a program table, decryption key data and the like to be processed by software of the digital TV receiver 500 from a broadcast stream (transport stream) received by the tuner 111 will be described with reference to FIGS. 6, 7 and 8C.

The data format of a transport stream and demultiplexing thereof will be described. A transport stream is composed of a series of transport stream packets. The transport stream packets, each 188-byte long, contain various types of digital broadcast data. The data contained in each transport packet is mostly a packetized elementary stream (PES) or section data. The PES includes audio/video data (elementary data) constituting a broadcast program. The section data includes a program table, decryption key data and the like to be processed by software of the digital TV receiver. Each transport stream packet is provided with a packet identifier (PID) indicating the type of data contained in the packet, that is, an image, voice or a program table and the like. The section data is prefixed with header information, which includes information such as a more specified category of the data and the update situation of the data.

The demultiplexer 504 identifies the PID of each transport stream packet input, to determine whether the packet contains an elementary stream of a program to be received or section data to be received and thus sort every transport stream packet (PID-filtering). The demultiplexer 504 then retrieves a PES or section data from the transport stream packet. The retrieved section data is further subjected to sorting (section-filtering) based on the header information of the section data. In general, the section-filtering includes comparing the 16-byte header portion of the section data with 32 kinds of condition data to determine whether or not there is a match. The sorted PES and section data are temporarily stored in the memory 106 type by type, and then the PES as audio/video data is decompressed and played back with the AV decoder 505. The section data is processed by software to retrieve a program table and decryption key data, so that the operation of the digital TV receiver 500 is controlled based on the retrieved information.

In general, the data rate of a transport stream adopted in digital TV broadcasting is about 30 Mbps (20000 packets/sec). It is therefore required to execute the demultiplexing at this data rate in real time. In particular, the section-filtering must be executed ten times at maximum for one transport stream packet. This means that comparison of 32 kinds×16 bytes must be performed for (20000 packets×10) pieces of section data every second (comparison of a total of 100 Mbytes or more).

In Embodiment 2, the PID-filtering and the section-filtering of the demultiplexing are performed in two stages, not in real time.

First, the demultiplexer 504 retrieves elementary data to be received by PID-filtering and stores the retrieved data into the memory 106. Also, the demultiplexer 504 prepares a partial transport stream from the remainder of the input transport stream including only a transport stream packet having a PID indicating section data to be received, and temporarily stores the prepared partial transport stream into the memory 106. The temporarily stored partial transport stream is sequentially retrieved from the memory 106 and input again into the demultiplexer 504 for section-filtering.

In general, out of the data rate, 30 Mbps, of a transport stream for digital TV broadcasting, 1 to 2 Mbps is used for section data and the remainder for elementary data. That is, the average data rate of the partial transport stream composed of only section data to be received retrieved by the PID-filtering is only 1 to 2 Mbps. Therefore, the capability of the comparison required for the section-filtering is reduced to one-thirtieth to one-fifteenth compared with real-time processing of the received transport stream as described above. This reduces the circuit scale and thus enables the section-filtering by software.

Hereinafter, the two-stage demultiplexing as described above will be described specifically. Assume that the average data rate of section data to be received in a transport stream received from a broadcast is 1 Mbps.

The CPU 107 sends a control signal to the switch control register 609 instructing to turn ON the switch 15 of the switch group 605, the switch 23 of the switch group 603 and the switch 04 of the switch group 604. In response to the control signal, the switch control register 609 sends a control signal to the switch groups 605, 603 and 604 to turn ON the switches 15, 23 and 04. In response to this control signal, the switches 15, 23 and 04 are turned ON. The demultiplexer 504 is set so as to retrieve only a packet including section data to be received from a stream input at the input port IN2 by PID-filtering, prepare a partial transport stream composed of only this packet, and outputs the partial transport stream from the output port OUT0. Also, the demultiplexer 504 is set so as to perform sorting of section data for a stream input at the input port IN1 and store the sorted data into the memory 106. Moreover, the address of a data storage region of the memory 106 is set in the DMA circuit 506, and the DMA circuit 506 is set so as to store a stream input at the input port IN0 into this data storage region, and also read the stored data at a low rate (1 Mbps) and output the read data from the output port OUT0.

A stream received by the tuner 111 is input into the input terminal T31 of the switch matrix 502, passes through the switch 15, and is output from the output terminal T45 to the input port IN2 of the demultiplexer 504. The demultiplexer 504 extracts only a packet including section data from the stream by PID-filtering to prepare a partial transport stream composed of only section data, and outputs the prepared partial transport stream from the output port OUT0. Since the average data rate of section data to be received is 1 Mbps, the data rate of this partial stream is 1 Mbps in average. The partial transport stream is sent to the input terminal T32 of the switch matrix 502, passes through the switch 23, and is output from the output terminal T43 to the input port IN0 of the DMA circuit 506. The DMA circuit 506 temporarily stores the input partial stream into the data storage region of the memory 106. Simultaneously, when a stream is already stored in the data storage region, the DMA circuit 506 reads the stream at a low rate (1 Mbps) and outputs the stream from the output port OUT0. The output stream passes through the switch 04 of the switch matrix 502 and is output from the output terminal T44 to the input port IN1 of the demultiplexer 504. The demultiplexer 504 retrieves section data from the stream input at the input port IN1, performs section-filtering for the section data, and stores the resultant data into a predetermined region of the memory 106.

As described above, a stream can be temporarily retained for section-filtering requiring no real-time processing and then processed as a low-rate stream.

Thus, by the demultiplexing in two stages described above, the scale of the circuit for the section-filtering can be reduced, and also the section-filtering can be realized by software.

In this embodiment, the DMA circuit 506 reads the partial transport stream stored in the memory 106 at a low rate. Alternatively, demultiplexer 504 may issue a data request, and in response to this request, the DMA circuit 506 may read the partial transport stream from the data storage region of the memory 106 and send the partial transport stream to the demultiplexer 504. In this case, the following setting may be given. Each output terminal of the switch matrix 502 is provided with an input of a data request signal. The data request signal, if input, passes through the switch matrix 502 following the connection route of the data in reverse, and is output to the input port associated with the relevant output terminal, to be sent to the sender of the stream. In the example described above, a data request signal is output from the input port IN1 of the demultiplexer 504, passes through the switch matrix 502, and is input into the DMA circuit 506 via the output port OUT0. The DMA circuit 506 reads a partial stream stored in the memory 106 in response to the received data request signal. The read partial stream is sent to the input port IN1 of the demultiplexer 504 via the switch matrix 502. By this data supply in response to a data request, demultiplexing capable of flexibly corresponding to a variation of the data rate of the partial stream is possible.

<Effect>

As described above, the system in Embodiment 2 includes the DMA circuit 506 that can read/write a stream from/into the memory 106. This makes it possible to temporarily store data during stream processing and also handle data processed by the CPU 107 as a stream. Therefore, the degree of freedom of the system configuration further improves.

Since supply of a stream in response to a data request signal is possible, the degree of freedom of the operation improves, and the number of types of input/output and processing means usable in combination increases.

The numbers of input/output ports described in this embodiment are mere examples and are not restrictive. In the above example, a data request signal was sent from the demultiplexer 504 to the DMA circuit 506. It is however possible to send a data request signal from any stream destination to a stream sender according to the setting of the switch matrix. Moreover, not only a data request signal but also other control signals can be sent in a manner similar to that described above.

Embodiment 3

In Embodiments 1 and 2, each switch group of the switch matrix selects one stream from streams input at eight input terminals and outputs the selected stream. In Embodiment 3, each switch group of the switch matrix can multiplex a plurality of streams and output the multiplexed streams.

<Configuration of Switch Group>

Figure 9:
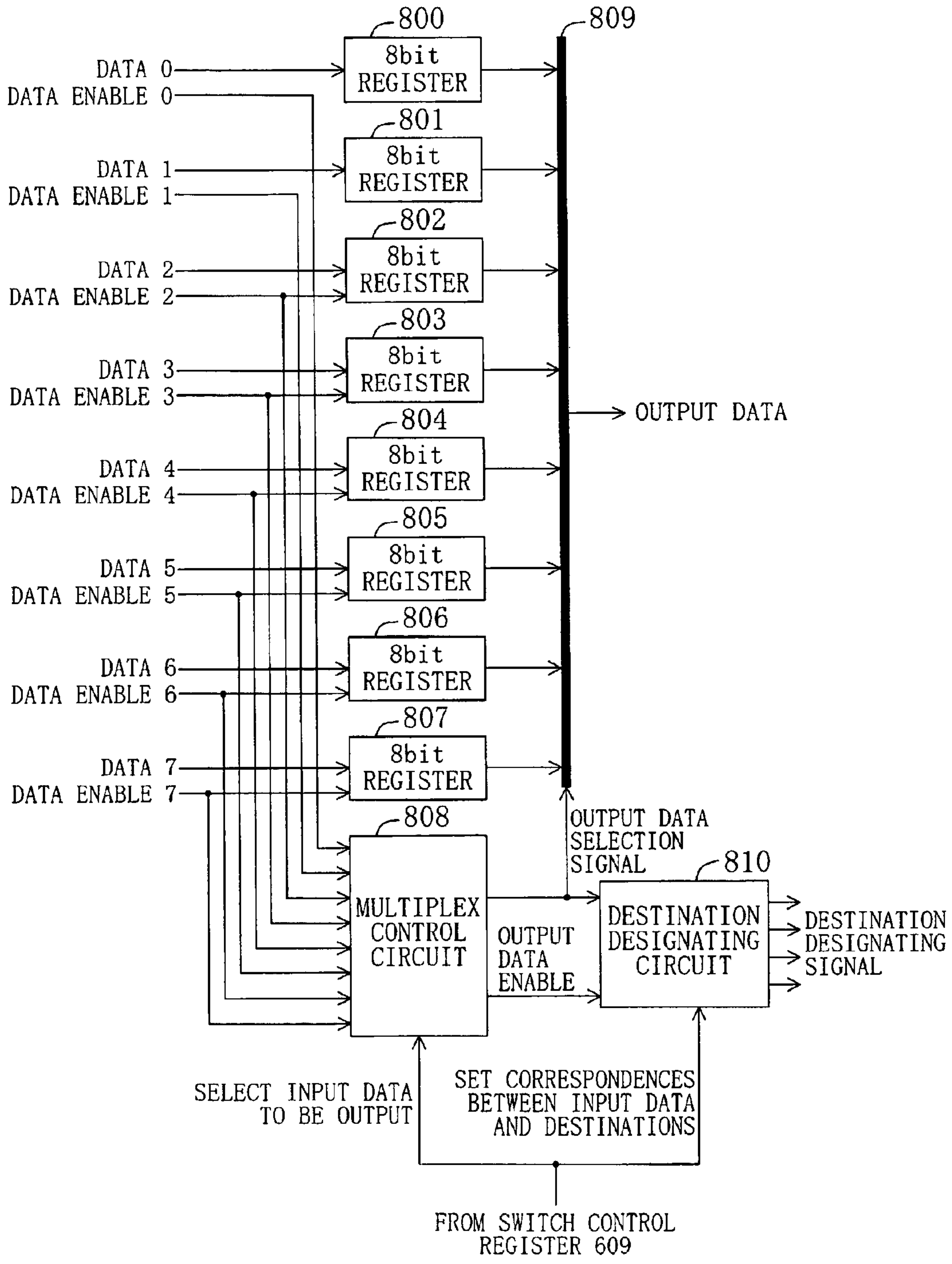
FIG. 9 is a block diagram of a switch group in Embodiment 3 of the present invention.

FIG. 9 is a block diagram of a switch group in Embodiment 3. The configuration of a system in this embodiment other than the switch group is the same as that of the system shown in FIGS. 6 and 7. Referring to FIG. 9, input streams 0 to 7 are received by registers 800 to 807, respectively, every time data enable signals 0 to 7 are made active indicating existence of effective data input. The data enable signals 0 to 7 are also input into a multiplex control circuit 808, which monitors which one of the registers 800 to 807 stores data. The multiplex control circuit 808 also controls a selector 809 to sequentially select the registers 800 to 807 when the registers store data, and outputs an output data enable signal and an output data selection signal. The multiplex control circuit 808 receives an output selection signal from the switch control register 609 and controls whether or not multiplex output should be done every receipt of the signal. The output data enable signal and the output data selection signal are input into a destination designating circuit 810. The destination designating circuit 810 is informed of the correspondences between the inputs into the switch group and the output destinations by the switch control register 609. Based on the correspondences, the destination designating circuit 810 outputs a destination designating signal that indicates the destination to which the input data indicated by the output data selection signal should be output. In this way, the switch group multiplexes designated data among a plurality of input date items and outputs the multiplexed data. Simultaneously, the switch group can identify each of the multiplexed data items and output a signal indicating the destination of each data item. In a circuit receiving the multiplexed data and the destination designating signal, the original data items are separated from the multiplexed output data by referring to the destination designating signal, and individual processing for each data item is executed.

<Operation of Switch Group>

Figure 10:
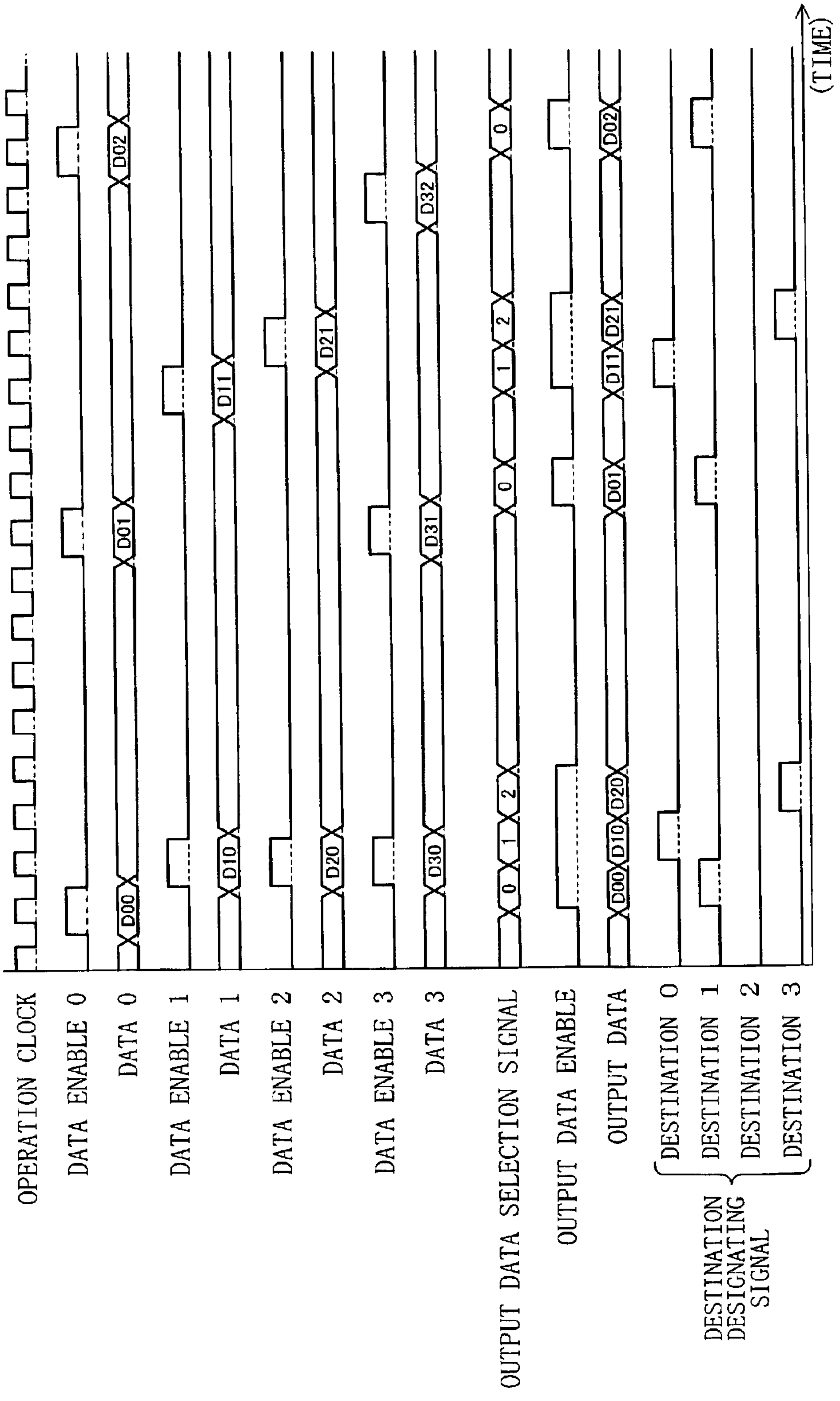
FIG. 10 is a timing chart of an example of operation of the switch group shown in FIG. 9.

FIG. 10 shows a timing chart of an example of the operation of the switch group. In this example, in which data 0, data 1, data 2 and data 3 are input, assume that the switch control register 609 instructs multiplex output of data 0, data 1 and data 2 among others. Also assume that the switch control register 609 designates the correspondences of data 0 with destination 1, data 1 with destination 0, and data 2 with destination 3. First, data 0 is input and stored in the register 800. The selector 809 selects and outputs data 0 at the next clock. Simultaneously with this selection, the destination designating signal indicating destination 1 is output from the destination designating circuit 810. Thereafter, data 1, date 2 and data 3 are simultaneously input and written in the registers 801 to 803, respectively. At the next clock, under instruction of the multiplex control circuit 808, data 1 is output and simultaneously the destination designating signal indicating destination 0 is output. At the next clock, data 2 is output and simultaneously the destination designating signal indicating destination 3 is output. Data 3 is not output because there is no output instruction from the switch control register 609. By providing the switch group operating as described above, a plurality of streams can be multiplexed and input into the AV decoder 505 or the like as one stream.

Figure 11:
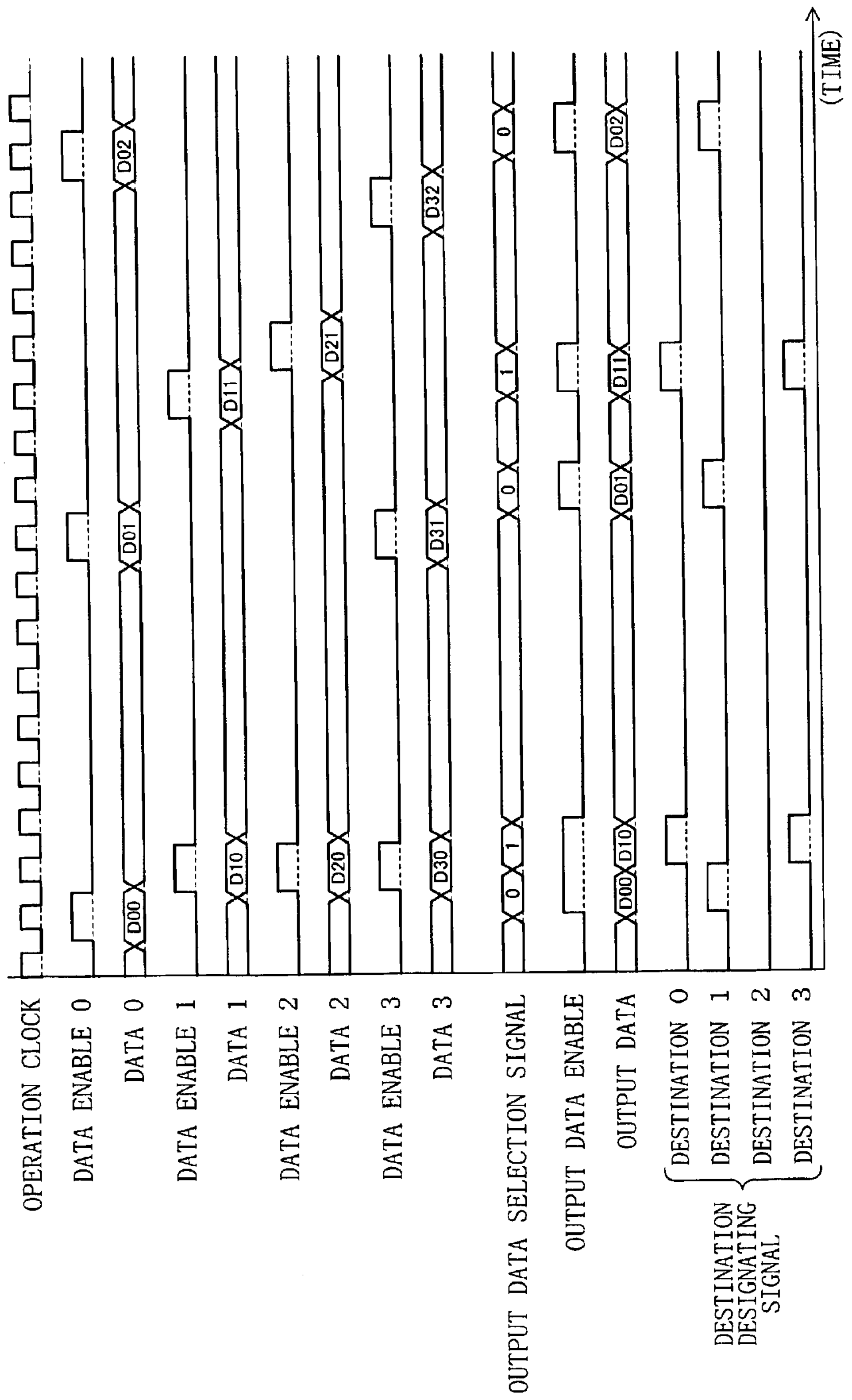
FIG. 11 it is a timing chart of another example of operation of the switch group shown in FIG. 9.

FIG. 11 shows a timing chart of another example of the operation of the switch group. In this example, in which data 0, data 1, data 2 and data 3 are input, assume that the switch control register 609 instructs multiplex output of data 0 and data 1 among others. Also assume that the switch control register 609 designates the correspondence of data 0 with destination 1 and the correspondence of data 1 with both destination 0 and destination 3 by data branching. First, data 0 is input and stored in the register 800. The selector 809 selects and outputs data 0 at the next clock. Simultaneously with this selection, the destination designating signal indicating destination 1 is output from the destination designating circuit 810. Thereafter, data 1, date 2 and data 3 are simultaneously input and written in the registers 801 to 803, respectively. At the next clock, under instruction of the multiplex control circuit 808, data 1 is output, and simultaneously both the destination designating signal indicating destination 0 and the destination designating signal indicating destination 3 are output. Data 2 and data 3 are not output because there is no output instruction from the switch control register 609. By providing the switch groups operating as described above, a plurality of streams can be multiplexed and input into the AV decoder 505 or the like as one stream. In addition, two of three streams input into the AV decoder 505 may be the same. That is, branching of one stream into two for execution of two types of processing described in Embodiment 1 can also be realized using the switch group capable of outputting multiplexed data.

<Functions Attainable by this System>

The system shown in FIGS. 6 and 7 provided with the switch group described above can realize the following functions. In this relation, assume that the AV decoder 505 can receive multiplexed streams composed of a plurality of streams as an input stream, retrieve the respective multiplexed streams based on the destination designating signals, and decode the retrieved streams as individual AV data.

Described as follows is a case of decoding two types of video data, that is, a played back stream from the digital video camera 508 connected to the bus B2 and a played back stream from the DVD drive 509 connected to the HDD interface 105, simultaneously with the AV decoder 505 for displaying.

The switch group is set by the CPU 107 and the switch control register 609 to turn ON the switches 42 and 72 so that a stream input at the input terminal T34 and a stream input at the input terminal T37 are multiplexed and output. Also, the IEEE 1394 interface 503 is set so as to output a played back stream from the digital video camera 508 from the output port OUT0. The HDD interface 105 is set so as to output a played back stream from the DVD drive 509 from the output port OUT0.

The played back stream from the digital video camera 508 is output from the output port OUT0 of the IEEE 1394 interface 503 and reaches the switch 42. The played back stream from the DVD drive 509 is output from the output port OUT0 of the HDD interface 105 and reaches the switch 72. The two streams are multiplexed in the switch group 602 and input into the input port IN0 of the AV decoder 505. The AV decoder 505 decodes the multiplexed two streams individually and displays images of these streams.

Having the configuration and operation described above, free connection of a plurality of streams is possible with the mere one-line stream connection in the aspect of the circuit scale.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A stream processor comprising:

a selection section having a plurality of inputs associated with a plurality of outputs according to control from outside so that streams sent to the plurality of inputs are passed to the associated outputs;

a first processing section for sending a first stream to the first input among the plurality of inputs;

a second processing section for sending a second stream to the second input among the plurality of inputs;

a third processing section for receiving a stream from the first output among the plurality of outputs;

a fourth processing section for receiving a stream from the second output among the plurality of outputs; and a fifth processing section for receiving a stream from the third output among the plurality of outputs, subjecting the received stream to predetermined processing, and sending the processed stream to the third input among the plurality of inputs.

2. The stream processor of claim 1, wherein the selection section associates the plurality of inputs with the plurality of outputs in one-to-one relationship.

3. The stream processor of claim 1, wherein the selection section associates one input among the plurality of inputs with two outputs among the plurality of outputs.

4. The stream processor of claim 2, wherein the selection section multiplexes at least two outputs among the plurality of outputs to obtain one new output.

5. The stream processor of claim 3, wherein the selection section multiplexes at least two outputs among the plurality of outputs to obtain one new output.

6. The stream processor of claim 1, wherein the fifth processing section retrieves desired information from the received stream to generate a partial stream and sends the generated partial stream to the third input among the plurality of inputs.

7. The stream processor of claim 1, wherein at least one of the third processing section and the fourth processing section outputs the received stream after change of the interface format of the stream.

8. The stream processor of claim 1, wherein at least one of the first stream and the second stream includes video data and/or audio data, and at least one of the third processing section and the fourth processing section decodes the video data and/or the audio data included in the received stream.

9. The stream processor of claim 8, wherein the fifth processing section retrieves desired video data and/or audio data from the received stream and sends the retrieved video data and/or audio data to the third input among the plurality of inputs.

10. The stream processor of claim 1, wherein at least one of the first stream and the second stream has been encrypted, and the fifth processing section decrypts the received stream.

11. The stream processor of claim 1, wherein the fifth processing section encrypts the received stream.

12. The stream processor of claim 10, wherein at least one of the first stream and the second stream has been encrypted according to a first encryption scheme, the stream processor further comprises a sixth processing section, and the sixth processing section receives a stream from the fourth output among the plurality of outputs, encrypts the received stream according to a second encryption scheme, and sends the encrypted stream, which is encrypted according to the second encryption scheme, to the fourth input among the plurality of inputs.

13. The stream processor of claim 1, further comprising a memory section, at least one of the third processing section and the fourth processing section writes the received stream into the memory section, at least one of the first processing section and the second processing section reads a stream from the memory section and gives the read stream to the associated input.

14. The stream processor of claim 13, wherein at least one of the third processing section and the fourth processing section memorizes the write position in the memory section of the stream written in the memory section, and at least one of the first processing section and the second processing section memorizes the read position in the memory section of the stream read from the memory section.

15. The stream processor of claim 14, wherein at least one of the first processing section and the second processing section reads the stream from the memory section by referring to the write position memorized in at least one of the third processing section and the fourth processing section.

16. The stream processor of claim 14, wherein at least one of the third processing section and the fourth processing section writes the stream in a region of the memory section other than a region in which an unread stream is stored by referring to the read position memorized by at least one of the first processing section and the second processing section.

17. The stream processor of claim 13, wherein at least one of the first stream and the second stream includes a plurality of packets, each of the plurality of packets includes identification information indicating the type of data contained in the packet, the fifth processing section retrieves a desired packet from the plurality of packets included in the received stream by referring to the identification information to generate a first partial stream, and sends the first partial stream to the third input among the plurality of inputs, the selection section is associated such that the first partial stream input from the third input is output from the first output, the third processing section writes the received first partial stream into the memory section, at least one of the first processing section and the second processing section reads the first partial stream from the memory section and sends the read first partial stream to the associated input as a second partial stream, the selection section is associated such that the second partial stream input from the associated input is output from the second output, and the fourth processing section extracts desired information from the received second partial stream.

* * * * *

UNITED STATES PATENT AND TRADEMARK OFFICE

CERTIFICATE OF CORRECTION

PATENT NO. : 7,054,989 B2
APPLICATION NO. : 10/210096
DATED : May 30, 2006
INVENTOR(S) : Norihiki Mizobata It is certified that error appears in the above-identified patent and that said Letters Patent is hereby corrected as shown below:

On the title page,

Under item (56) References Cited, FOREIGN PATENT DOCUMENTS, change "JP 11-196975 10/1999" to -- JP 11-296975 10/1999 --

Signed and Sealed this

Twenty-sixth Day of December, 2006

JON W. DUDAS
*Director of the United States Patent and Trademark Office*